United States Patent Office 3,463,910
Patented Aug. 26, 1969

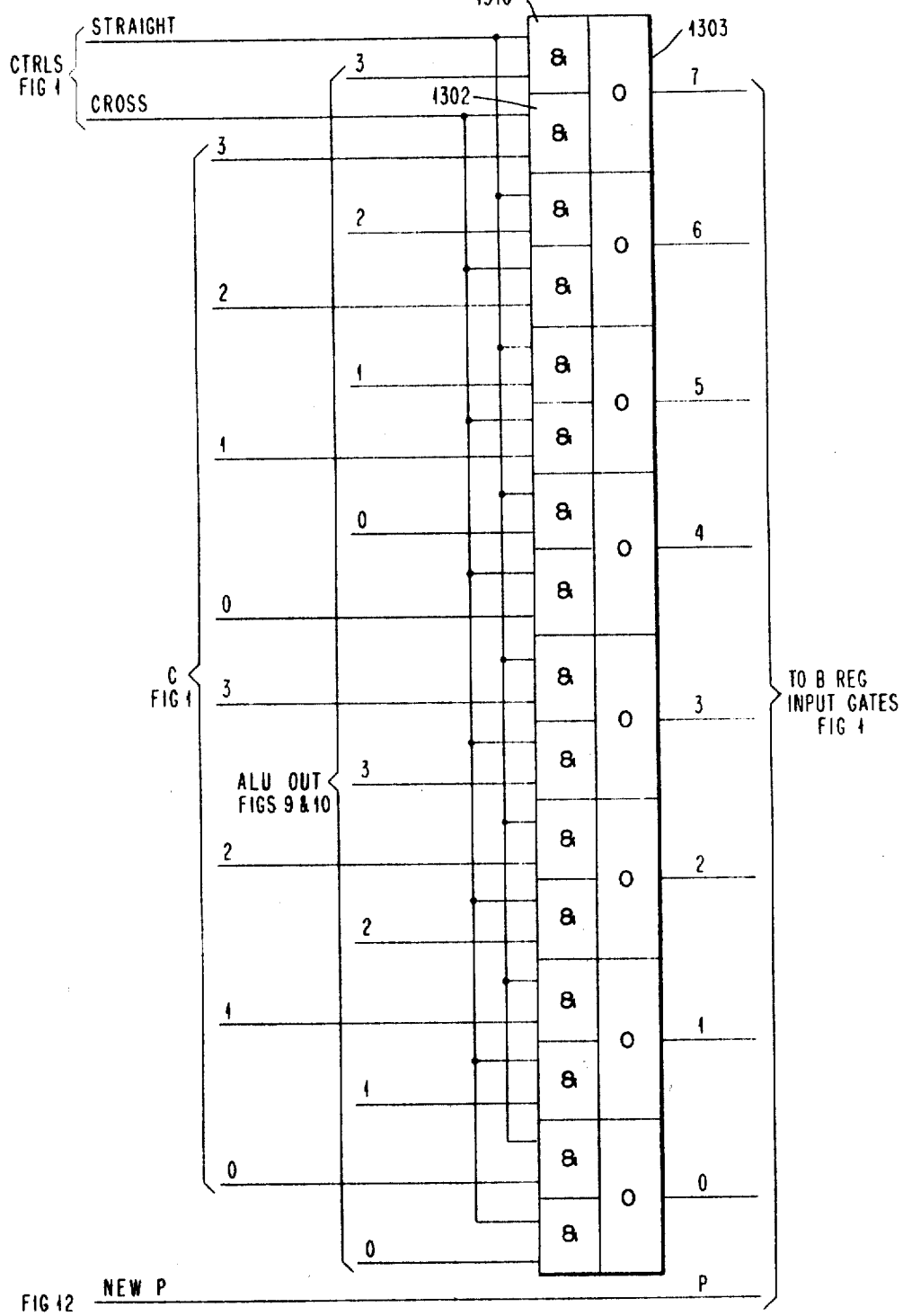

3,463,910
DIGIT PROCESSING UNIT
Robert Keslin, Hyde Park, N.Y., assignor to International Business Machines Corporation, Armonk, N.Y., a corporation of New York
Continuation-in-part of application Ser. No. 223,431, Sept. 13, 1962. This application Jan. 4, 1966, Ser. No. 518,619
Int. Cl. G06f *11/00;* G11b *13/00*
U.S. Cl. 235—153                5 Claims

ABSTRACT OF THE DISCLOSURE

This disclosure relates to a high speed processing unit capable of performing arithmetic and logical functions on selectable digits while maintaining parity of larger word factors from which the digits are selected. The arithmetic and logical functions are performed by a single data path having a logical connective generator and a final adder stage acting together to perform logical connective functions upon two inputs of data or to perform addition functions upon two inputs of data.

---

This invention is a continuation-in-part of a previous, copending application of the same assignee and inventor entitled "Byte Processing Unit," Ser. No. 223,431, filed on Sept. 13, 1962, now abandoned; priority is claimed on the basis of said copending application as of Sept. 13, 1962.

In the data processing art, one of the greatest difficulties in machine design is resolution of the different word sizes which are required by different applications of a machine being designed. For instance, in large, scientific arithmetic environments, a very large (such as 64-bit) binary data word (with corresponding data flow, and arithmetic and logic units) is most economical. On the other hand, in commercial applications where decimal values are involved, (such as relating to money), a 4-bit binary word size is useful to represent the four binary bits required to make a binary-coded decimal digit; usually, however, since alphabetical information is also involved, six basic bits in a word are required in commercial applications. In some applications, the length of an entire word, or field, which may comprise a plurality of characters or digits, is defined by a word mark bit in the highest-ordered character of the field. Thus, a commercial word size may be conveniently established at around seven binary bits. When fixed-word length machines are used for commercial purposes, it is therefore useful to utilize a basic word grouping of eight bits, which will hereinafter be referred to as a byte: within this 8-bit byte, it is possible to supply two binary-coded decimal digits, or one alphabetic character (with some bits left over) or one decimal digit and a sign, etc. Alternatively, the eight binary bits may be considered a portion merely of a larger number of binary bits which represent a large binary operand. Thus, there are applications which require the economy of binary operations in some instances, and which require the shorter, decimalized notation for commercial applications.

Data processing machines therefore preferably establish a word format which is adaptable for either the large binary applications or the small, alphabetic applications. The preferred word format therefore may comprise eight data bits together with a parity bit, which is hereinafter referred to as a parity-checked byte, a plurality of which may be associated so as to form a data word, such as a four-byte 32-bit data word with an additional four parity bits, one respectively corresponding to each byte of data. This word is often referred to as a 36-bit word since the total combination of data and parity bits totals thirty-six.

A primary object of the present invention is to facilitate arithmetic and logic operations on decimal digits in a system utilizing a large binary-word format; another object is to facilitate performing arithmetic and logical operations on less than a parity-checked byte without nullifying the parity checking capability of the system through the use of a single data path.

An additional object is the provision of maximum arithmetic and logic capability with a minimum of hardware, and to provide such a capability in circuitry operable at relatively high speeds.

A further object is to provide a single data path capable of performing both arithmetic and logical functions through the operations of a logical connective generator and a final adder stage, each in the same data path.

In accordance with the present invention, there is provided an arithmetic and logic unit capable of operating on less than an entire parity-checked byte, while maintaining proper parity in a full byte which includes data bits not operated upon during any given cycle. Arithmetic operations are performed by utilizing the logical circuits to provide partial sums, which are combined with propagate carry look-ahead signals in a final adder stage to produce final sums. The final sums may be decimal-corrected or not, in dependence upon the type of data which is being handled. Means are provided to permit operating on different portions of a parity-checked byte and to provide a correct, final parity for the byte whenever the data is changed in either portion thereof. The apparatus in accordance herewith is adapted for inclusion in a data processing system utilizing a data word which is made up of a plurality of parity-checked bytes. The circuitry is relatively simple, and due to carry look-ahead and parity predict circuitry, is capable of relatively high speed, whereby iterative operations can proceed on an efficient basis.

Other objects, features and advantages of the present invention will become more apparent in the light of the following detailed description of a preferred embodiment thereof, as illustrated in the accompanying drawings.

In the drawings:

FIG. 13 is a schematic block diagram of a straight-cross gating circuit for the embodiment of FIG. 1.

Figure 1:
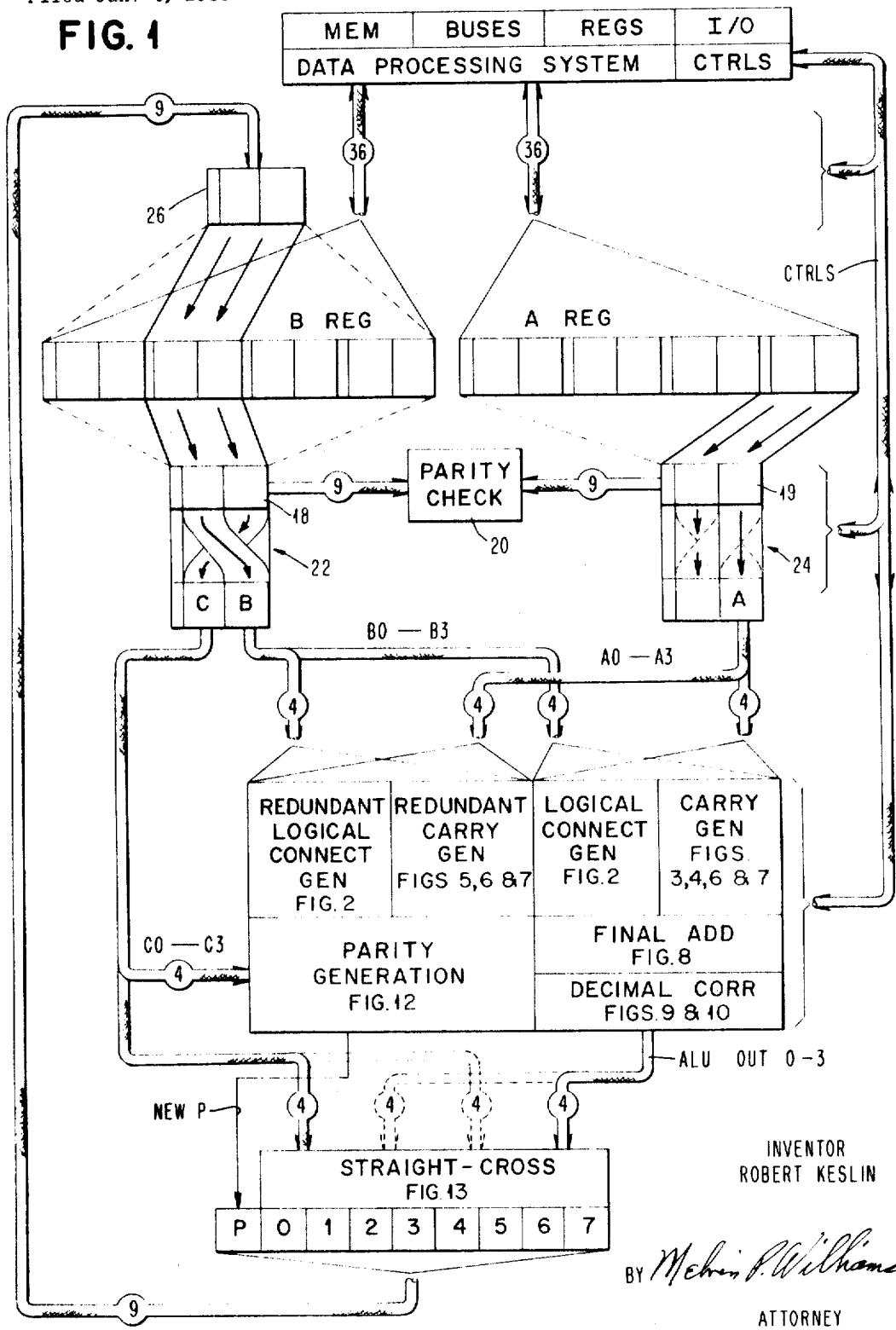
FIG. 1 is a simplified schematic block diagram of a preferred embodiment of the present invention set in an environment of an illustrative data processing system, the environment system being shown at the top thereof, and the block diagram of a digit processing unit in accordance with the present invention being shown at the bottom.

An embodiment of the invention is illustrated in the bottom half of FIG. 1; an environment in which the invention is most advantageously utilized is illustrated in the remainder of FIG. 1. Therein, the invention is shown, by way of example, in an environment which includes a data processing system having a normal word length of 36 bits, each word comprising four parity-checked bytes, each byte including eight data bits and one parity bit. The data processing system includes an A register and a B register together with input and output gating therefor (26; 18, 19) and a parity check circuit 20 relating thereto; the system also includes a memory, buses, other registers, input/output equipment, and controls, all as is well-known in the art. It should be understood, that the configuration of FIG. 1 is illustrative of an environment for the invention herein, illustrating particularly the usefulness of the invention as a digit processing apparatus within a large data processing system. The apparatus illustrated in FIG. 1 will usefully perform decimal operations a digit at a time, or iterative hexadecimal binary operations (one hexadecimal digit comprising four binary bits having decimal values of from 0 to 15). Thus, on a first cycle, a byte may be selected from the B register and a second byte from the A register, a digit of the A register being selected from the A REG byte and applied to the logical and carry circuits illustrated in FIGS. 2 through 6. Similarly, a byte is selected from the B register, and one-half of the byte is applied as a B digit input to the same circuits as is the A digit; the other half is applied as a C digit to the parity generation circuits and to the straight-cross circuits shown in FIGS. 12 and 13, respectively. Both the A register and the B register have parity checking at the output thereof by means of a parity check circuit 20, and each of these registers supplies a selected byte to a straight-cross mechanism 22, 24 respectively. Thus, either half of the selected A register byte may be applied to the arithmetic and logic circuits, and either half of the selected B register byte may be applied to these same circuits, the other half of the selected B register byte being carried along merely to complete the parity-checked byte when the result of the selected digits (byte halves) has been calculated. The result byte which appears at the output of the straight-cross circuitry illustrated in FIG. 13 is complete including a new parity bit which reflects changes in half of the selected B register byte as the result of arithmetic or logic operations. This byte is returned to the B register through an input gating means illustrated briefly at 26. Thus, the circuit of FIG. 1 performs the general type of operation of combining A with B and putting the result in the B register.

The system shown in FIG. 1 is capable of taking the low-order half of the A register byte by causing the gating circuit 24 to pass the byte straight (as is), in the manner shown with respect to the A digit in FIG. 1, and on the subsequent cycle, transpose the digits within the byte in the manner shown with respect to the digits C and B in FIG. 1; the same is true of the output of the B register. The gate circuits 22, 24 may be of the same general nature as the straight-cross circuits of FIG. 13, which is referred to at the bottom of FIG. 1.

Referring to the block diagram of the embodiment of the invention in the lower-half of FIG. 1, note that there are two halves to the arithmetic and logic circuit: one half includes the logical connect generator and the carry generator which supply inputs to the final add circuit and to the decimal correct circuit; the other half provides redundant logic and carry manifestations for application to the parity generator; production of these extra, or redundant logic and carry functions is not essential, but is useful in providing an independently-generated parity bit whereby a check of the parity at the output to the arithmetic and logic circuits will indicate if there has been a circuit failure somewhere therein. As an alternative, if a given environment is willing to forego the checking of the circuitry, the parity generation can be achieved by means of the same logic and carry circuits which provide inputs to the final add circuit at the left-half of the block diagram at the bottom of FIG. 1.

Figure 2:
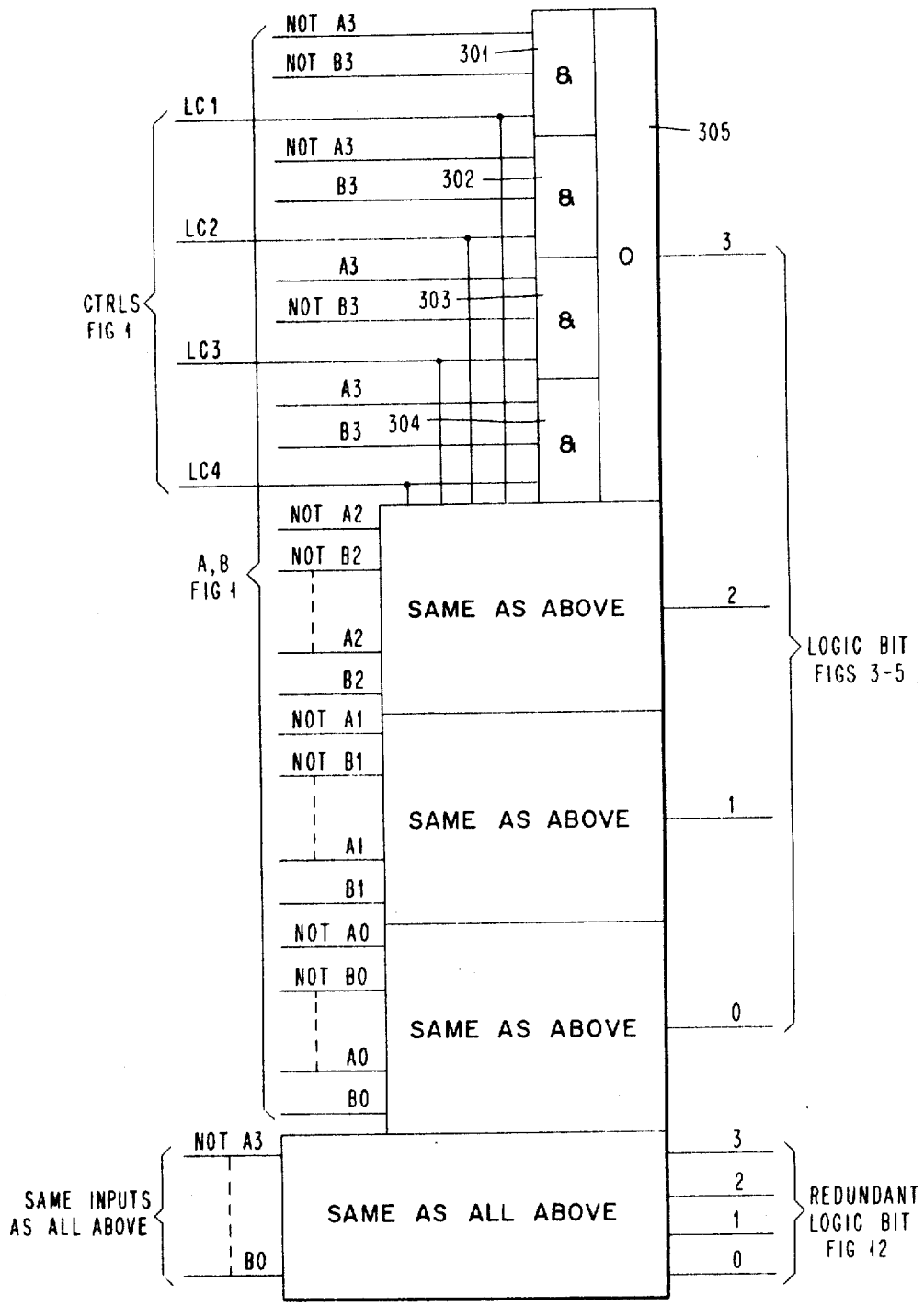
FIG. 2 is a schematic block diagram of a logic performing circuit for use in the embodiment of FIG. 1.

Referring now to FIG. 2, an OR circuit 305 is operated by any one of four AND circuits 301–304 so as to generate a logic bit for bit 3; similar AND circuits and OR circuits are provided for each of bits 2, 1 and 0, so that each of the corresponding pairs of A and B bits may be combined in a logic fashion. The determination of the logical function to be produced at the output of the OR circuit 305 (and corresponding OR circuits for the other bits) is determined by control signals from the remainder of the data processing system on lines LC1 through LC4. If the line LC1 is energized, then the OR circuit 305 will have an output only if bit 3 of both the A and B digits is ZERO; the LC2 control line will cause the OR circuit 305 to have an output if bit 3 of the A digit is ZERO and bit 3 of the B digit is a ONE; the control line LC3 will cause an AND circuit 303 to pass a signal through the OR circuit 305 if A3 is a ONE and B3 is a ZERO; and AND circuit 304 will cause an output when both digits have a ONE in the bit 3 position, in response to the LC4 control signal. Thus, the four combinations 00, 01, 10, and 11 can be produced. In addition, it is possible to combine the effects of the various AND circuits 301–304 (and corresponding AND circuits for the other bits) so as to get more than the four functions provided therein: specifically, sixteen different combinations are possible as set forth in the following table.

In the table, a line over a letter means not logical "NOT," so that $\bar{A}$ equals NOT A, and indicates the complement of A, or indicates a ZERO in the A position.

LOGICAL CONNECTIVE CHART

| LC signals 1 2 3 4 | Connective | Result for the Example: A= 1010, B=1001 |
|---|---|---|
| 0 0 0 0 | All 0's (Don't care) | 0 0 0 0 |
| 0 0 0 1 | A B | 1 0 0 0 |
| 0 0 1 0 | A $\bar{B}$ | 0 0 1 0 |
| 0 0 1 1 | A (Don't care B) | 1 0 1 0 |
| 0 1 0 0 | $\bar{A}$B | 0 0 0 1 |
| 0 1 0 1 | B (Don't care A) | 1 0 0 1 |
| 0 1 1 0 | A $\ne$ B (Exclusive OR) (A$\dagger$B) | 0 0 1 1 |
| 0 1 1 1 | A V B | 1 0 1 1 |
| 1 0 0 0 | $\bar{A}$ $\bar{B}$ | 0 1 0 0 |
| 1 0 0 1 | A=B (Identity) ($\bar{A}$ $\ne$ B) | 1 1 0 0 |
| 1 0 1 0 | $\bar{B}$ (Don't care A) | 0 1 1 0 |
| 1 0 1 1 | A V $\bar{B}$ | 1 1 1 0 |
| 1 1 0 0 | $\bar{A}$ (Don't care B) | 0 1 0 1 |
| 1 1 0 1 | $\bar{A}$ V B | 1 1 0 1 |
| 1 1 1 0 | $\bar{A}$ V $\bar{B}$ | 0 1 1 1 |
| 1 1 1 1 | All 1's (Don't care) | 1 1 1 1 |

Notice that the LC signals control all four bit positions of both the logical connect generator and the redundant logical connect generator (which is shown in the bottom of FIG. 2), even though the digits are logically combined on a bit-by-bit basis (bit A3 being combined with bit B3, etc.). The redundant logic bits illustrated briefly at the bottom of FIG. 2 are generated in an identical fashion, and are provided, as described hereinbefore, merely to permit independently-generated parity bits for the purpose of checking the operation of all of the circuitry herein, which functions may be eliminated if desired by using the logic bits shown on the upper portion of FIG. 2 to generate the parity bit in FIG. 12, as described hereinafter.

The logic circuits are used to provide halfsums during arithmetic operations; an LC control configuration of 0110 being selected to cause the EXCLUSIVE OR function to be performed; also LC=1001 selects $\bar{A}$ $\ne$ B for complement add operations.

Figure 5:
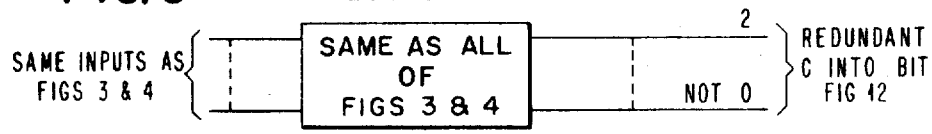
FIG. 5 is a simplified schematic block diagram of redundant carry propagate circuits for use in the embodiment of FIG. 1.
Figure 6:
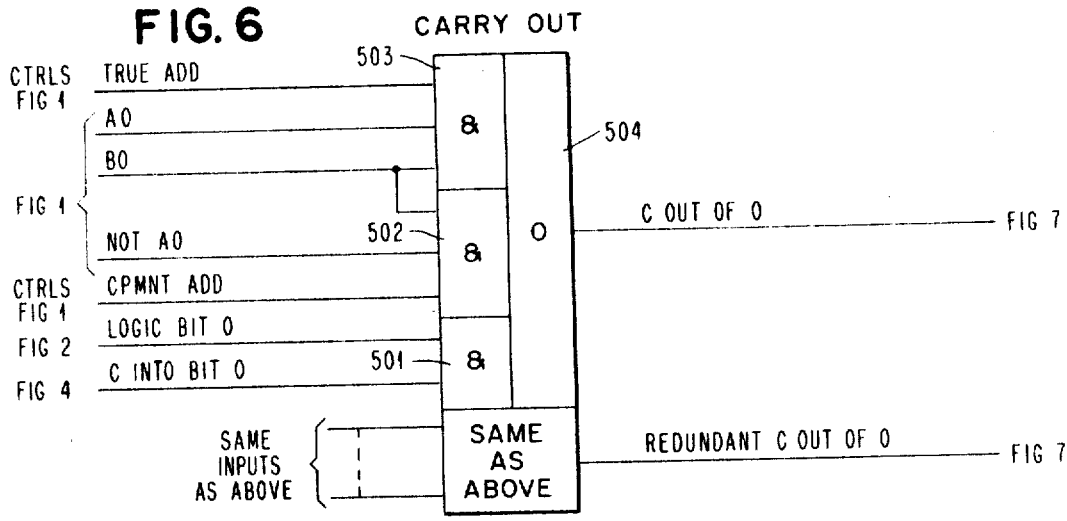
FIG. 6 is a simplified schematic block diagram of circuit for generating carry out of the digit and a redundant carry out of the digit for use in the embodiment of FIG. 1.
Figure 7:
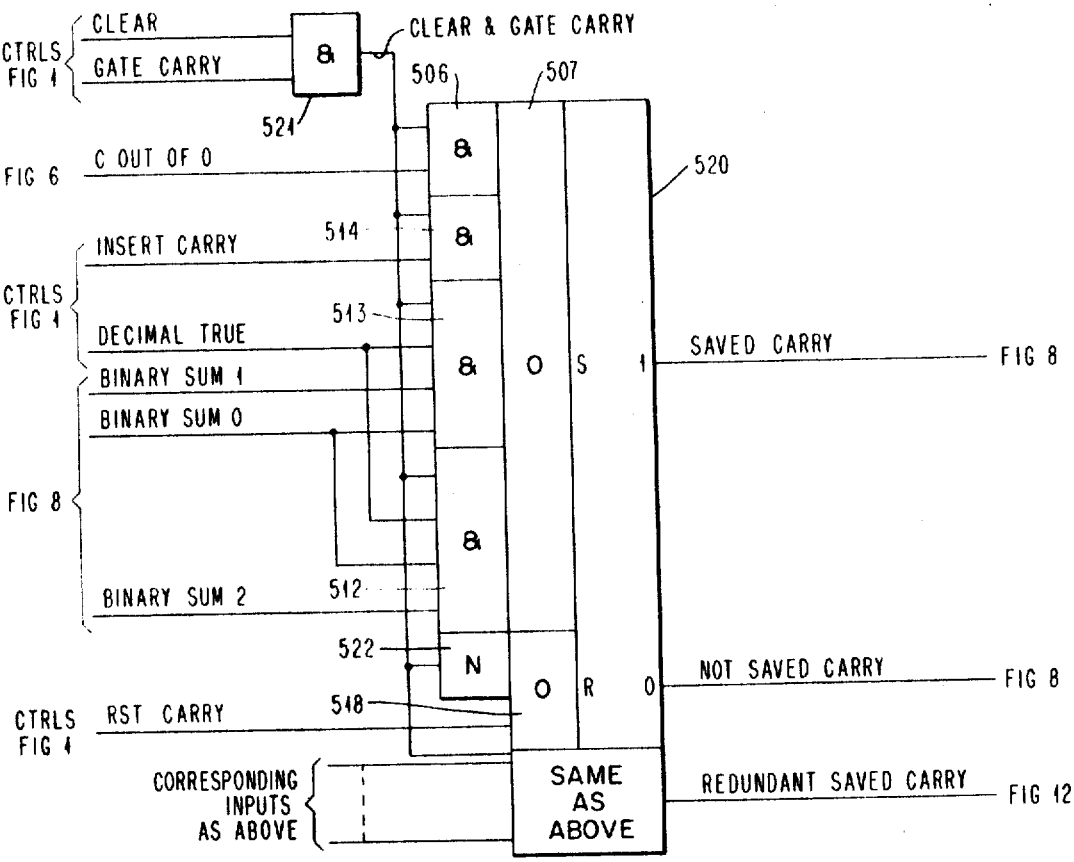
FIG. 7 is a schematic block diagram of a carry latch for use in the embodiment of FIG. 1.

Propagate carry look-ahead circuits are shown in FIGS. 3–6, and a carry from one cycle is saved for use in the handling of the digits presented to the arithmetic and logic circuits in a following cycle by the carry latch of FIG. 7.

Figure 3:
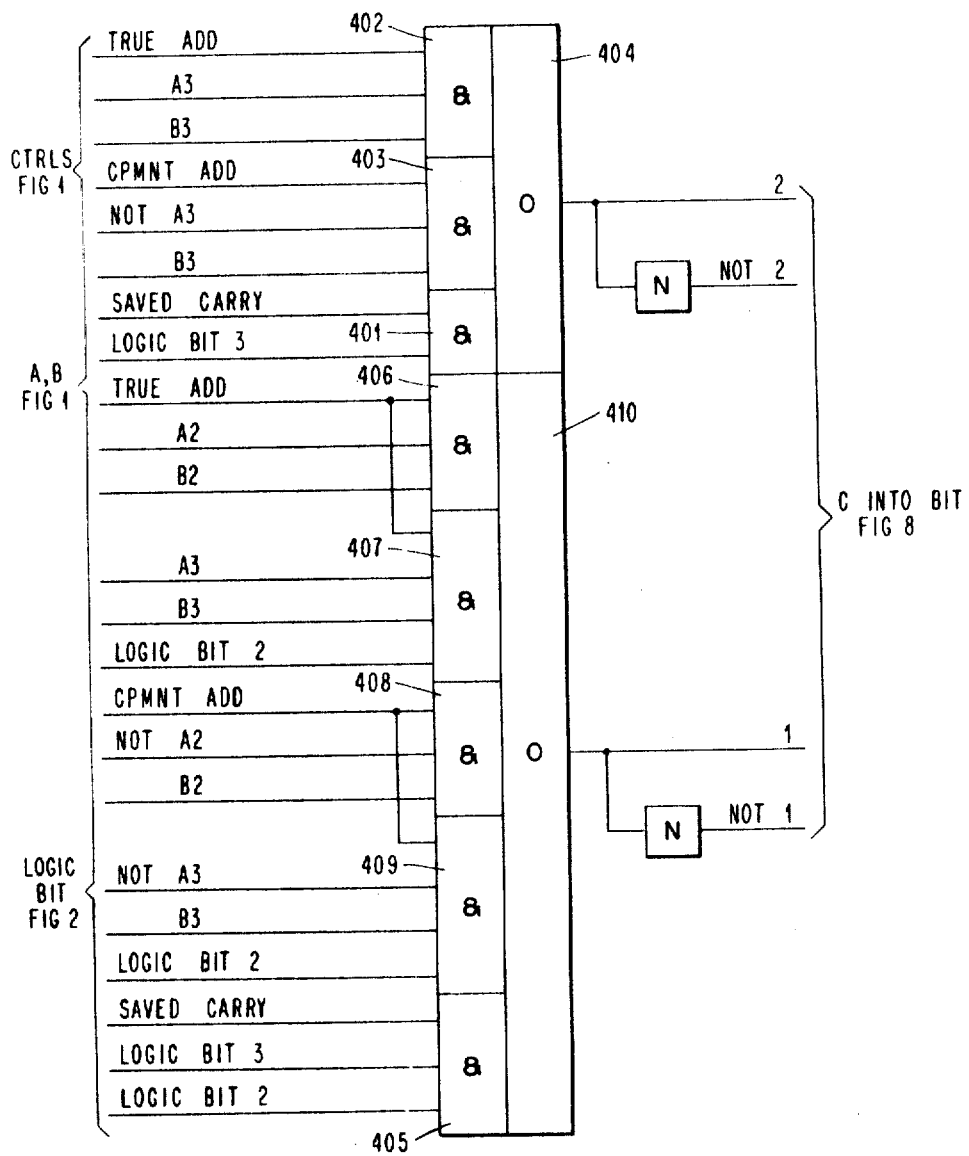
FIGS. 3 and 4 are schematic block diagrams of carry propagate circuits for use in the embodiment of FIG. 1.

In FIG. 3, the A and B input bits, the output of the logic circuit of FIG. 2, and controls which define whether a TRUE or COMPLEMENT add is to be performed are applied to a plurality of AND circuits 401–403, 405–409. These AND circuits cause related OR circuits 404, 410 to produce signals indicative of carries from one bit into the next bit as a result of the configuration of lower-order input bits. For instance, a carry from bit 3 into bit 2 will occur during a TRUE ADD operation if both A and B digits have bit 3 equal to a ONE: this is effected by the AND circuit 402. Similarly, the AND circuit 403 causes a carry into bit 2 during a COMPLEMENT ADD (Subtraction of A from B) when A3 is ZERO and B3 is ONE. If, in addition, there is a halfsum for bit 3, as indicated by logic bit 3, then there will be a carry into bit 2 if there is a saved carry resulting from operating on a previous pair of digits in a previous cycle. In other words, a carry into bit 3 is propagated if bit 3 has a halfsum, or if both bits are present in bit 3; this is effected by an AND circuit 401. The AND circuits 401, 402, and 403 have their counterparts in AND circuits 405, 406, and 408 with respect to bit 1. The only difference in these AND circuits is that in order for a saved carry to cause the carry into bit 1 it must ripple through both bits 2 and 3 so that the AND circuit 405 responds to logic bit 2 and logic bit 3 along with the saved carry. In addition, the AND circuit 407 will respond to a halfsum in bit 2 when A3 and B3 are both ONES, etc.

Figure 4:
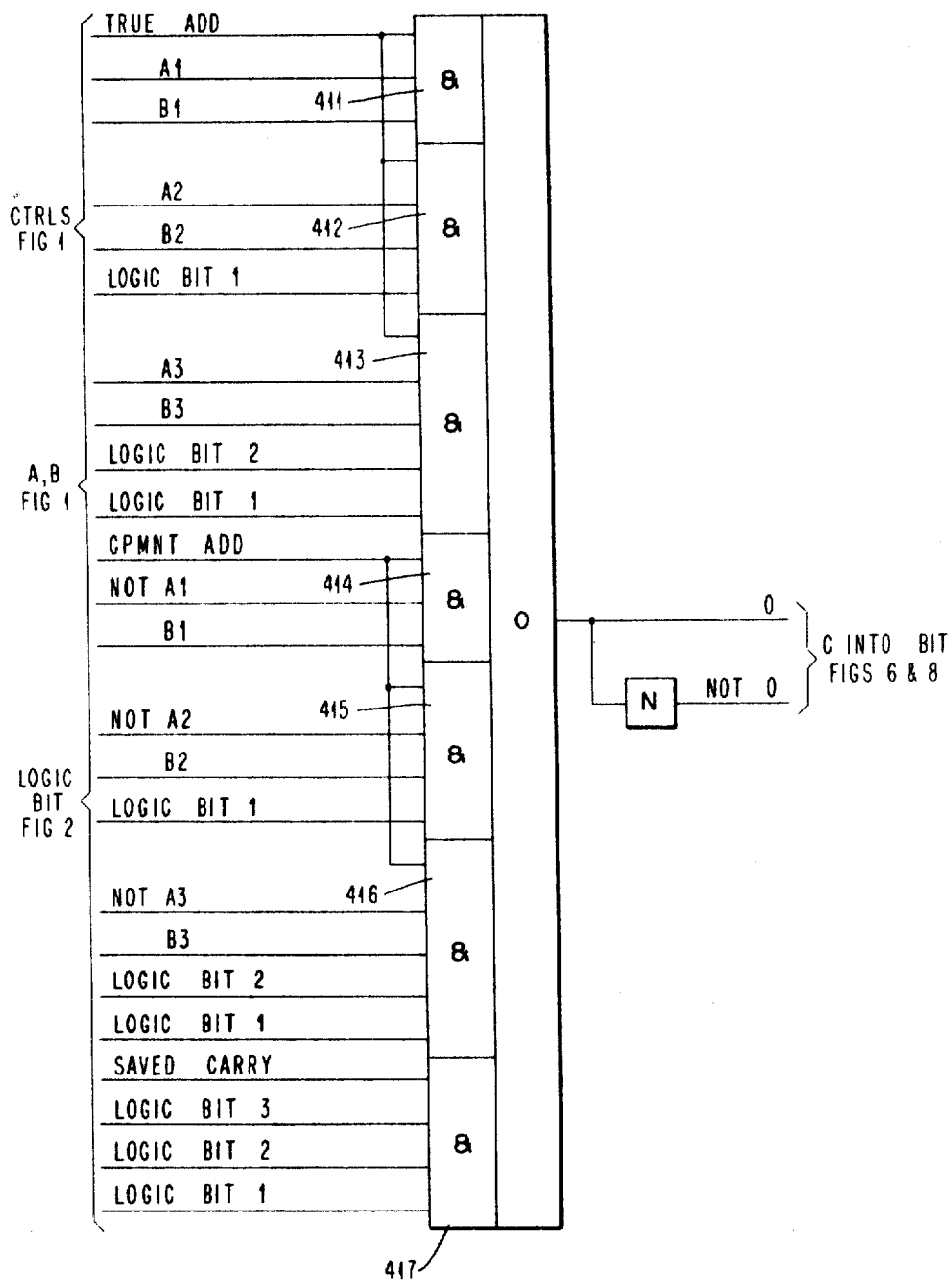

In FIG. 4, a similar group of AND circuits is shown operating an OR circuit so as to generate a signal indicative of a carry into bit ZERO (the highest-order bit of the digit) in response to various conditions. During a TRUE ADD, the presence of A1 and B1 will cause an AND circuit 411 to generate the signal, or if there is a halfsum in bit 1 and both bits A2 and B2 are present, then a carry out of bit 2 will propagate through bit 1 so as to form a carry into bit 0, as provided by an AND circuit 412. Similarly, if there is a halfsum in both bits 1 and 2, and bits A3 and B3 are also present, then an AND circuit 413 will cause a carry into bit 0. Corresponding results relate to COMPLEMENT ADDs, wherein AND circuits 414–416 correspond to AND circuits 411–413, respectively, with the exception of the fact that the A bit has to be absent in each instance since a COMPLEMENT ADD is an operation in the nature of B minus A. Additionally, an AND circuit 417 will provide a carry into bit 0 if there is a carry into the digit from the saved carry and a halfsum in each of the three lower-ordered bits of the digit.

Thus, FIGS. 3 and 4 generate carries into the various bits of the digit, each carry being generated in response to proper combinations a saved carry and the bit conditions in the lower-ordered bits of the digit.

Figure 12:
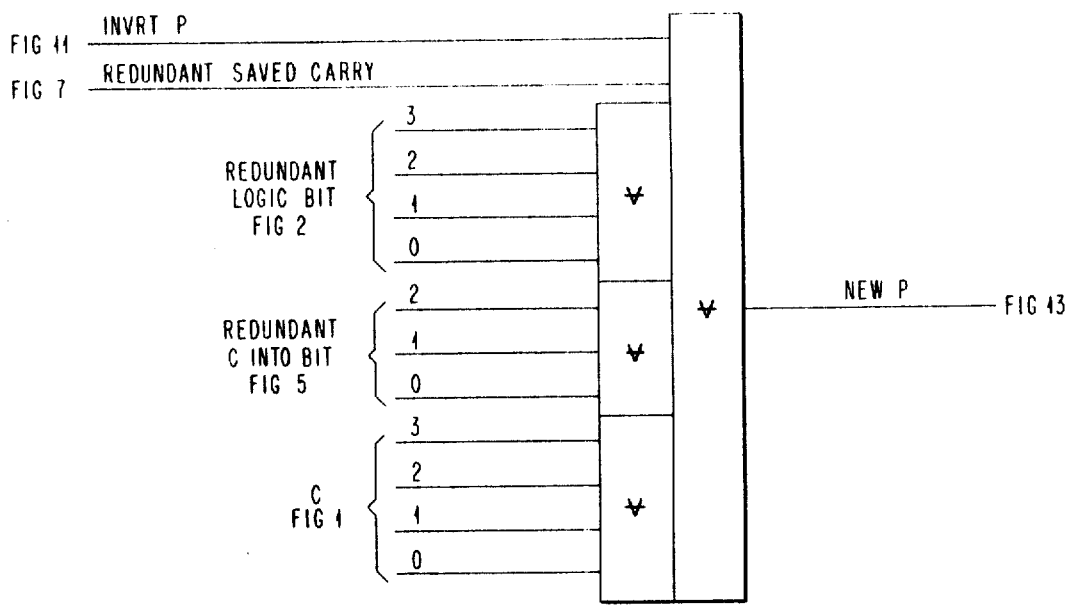
FIG. 12 is a schematic block diagram of a parity generation circuit for the embodiment of FIG. 1.

FIG. 5 is a simplified illustration of the fact that when redundant logic is used so as to generate an independent parity bit, all of the circuits of FIGS. 3 and 4 will be duplicated so as to generate redundant carries useful in the parity generation function of FIG. 12.

FIG. 6 contains the circuitry which recognizes when there is a carry out of the digit, which carry will be applied to the latch of FIG. 7 and utilized in the following cycle, under appropriate conditions. In FIG. 6, a carry out of bit 0 will be effected by an AND circuit 503 during a TRUE ADD if digits A0 and B0 are both present, this is a normal carry out of bit 0. Similarly, the AND circuit 502 will cause a carry in a COMPLEMENT ADD if B0 is a ONE and A0 is a ZERO. If the circuit of FIG. 4 causes a carry into bit 0, and if the circuit of FIG. 2 generates a halfsum for bit 0, then an AND circuit 501 will cause the OR circuit 504 to generate a carry out of bit 0. Thus, the circuits of FIGS. 3–6 respond in an ordinary manner, in accordance with well-known principles of binary arithmetic so as to generate carries for the digit.

FIG. 7 is illustrative of a latch which may be used to maintain carry indications from one cycle to the next: note that the nature of the carry latch is not important to the present invention, the one in FIG. 7 being illustrative of a type of latch which may be utilized to save a carry manifestation from one cycle to the next; furthermore, the principles of the invention are not dependent, necessarily, on related iterative cycles, such that provision of arithmetic and logic circuits together with the data flow control as illustrated herein without such a carry latch would be possible in certain applications. In FIG. 7, an AND circuit 521 is illustrative of logic which may respond to controls from the data processing system so as to release the latch and allow it to respond anew, the latch providing an output at the beginning of a cycle which indicates carry in a previous cycle and the latch being released during the cycle so as to permit it to respond to carry information during a present cycle. The latch 520 is settable by an OR circuit 507 in response to any one of four AND circuits 506, 512–514. The AND circuit 506 responds to a regular binary carry on the C OUT OF 0 line from FIG. 6. The AND circuit 514 allows forcing a carry under program control by presenting a signal on an INSERT CARRY line, for inserting a "HOT 1" in complementing operations, AND circuits 512 and 513 are operative during DECIMAL TRUE operations to recognize cases where the sum will be in excess of 10 so that even though there is no hexadecimal carry out of the 16-valued binary digit, there must be a carry out of the digit because the carry can only represent values of 0 through 9 in decimal operations. The setting of the carry latch 520 in FIG. 7 in response to either of the AND circuits 512, 513 during deciminal operations is not a propagate carry look-ahead type of operation because it relies on the actual sums from the final add circuit to determine that a value in excess of decimal 9 is involved. Decimal values of 10 or 11 are recognized by the AND circuit 512 because binary sum 0 and binary sum 2 will be present for decimal values of 10 and 11; for values between 12 and 15 (highest value which may be represented by a 4-bit hexadecimal group) the AND circuit 513 will cause a carry due to the fact that BINARY SUM 0 (decimal 8) and BINARY SUM 1 (decimal 4) together total 12 or more, in every case. The latch 520 is released, or permitted to go into the reset state, when the AND circuit 521 provides a gating signal to the AND circuits 506, 512–514 due to the fact that the CLEAR & GATE CARRY signal is applied to an OR circuit 518 through an inverter 522. Thus, whenever the latch is not settable, it will remain in the latched state (ON or OFF), but when the AND circuits are trying to operate the OR circuit 507, then the latch will be released so that if one of the AND circuits operates the OR circuit 507, the latch will turn ON, and if they do not operate the OR circuit 507, the latch will be put into the OFF or RESET state. The OR circuit 518 can also respond to a control signal on a RST CARRY line which allows program control to reset the carry latch if desired.

The bottoms of FIGS. 6 and 7 illustrate that similar logic would be provided to generate a redundant carry out of the digit and a redundant saved carry, for use in generating an independent parity bit in FIG. 12.

Figure 8:
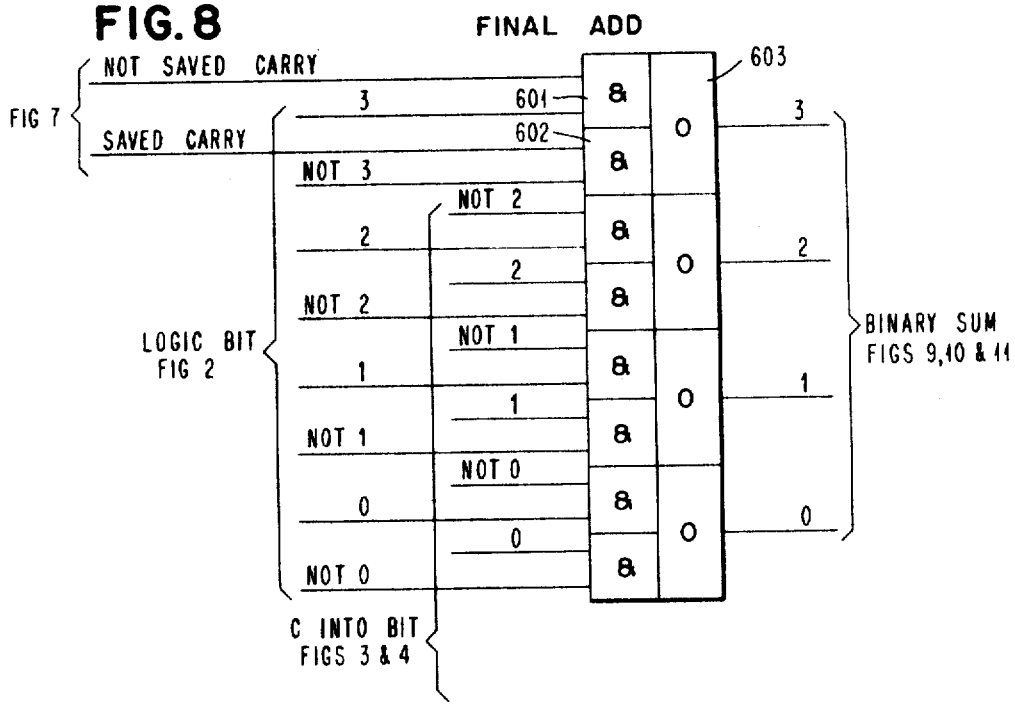
FIG. 8 is a schematic block diagram of the final add stage of the embodiment of FIG. 1.

The final sum is generated in a FINAL ADD stage illustrated in FIG. 8. Therein, the logic bit outputs (which equal the halfsums of an ADD operation) and carries into bits, which comprise the saved carry for the lowest-order bit and which comprise a carry into bit signals generated in FIGS. 3 and 4 for the three higher-order bits, are EXCLUSIVE ORed so as to provide final sums in accordance with well-known rules of binary addition. Thus, if there is a halfsum for bit 3 but no saved carry, then an AND circuit 601 will provide a signal through an OR circuit 603 to generate a BINARY SUM 3 signal; on the other hand, if there is no halfsum for bit 3 but there is a saved carry, then the AND circuit 602 will allow the OR circuit 603 to generate BINARY SUM 3. In any other condition, that is, either both or neither of the signals being present, then neither one of the AND circuits 601, 602 can operate so as to generate a sum signal. In other words, the circuits 601–603 comprise an EXCLUSIVE OR circuit for generating the binary sum. Note that the logic bit inputs to FIG. 8 comprise the halfsums due to the fact that in accordance with the features of this invention, the adder comprises usage of the logic connect circuit (with the LC signals set for the EXCLUSIVE OR so as to generate halfsums) together with the carry circuits, the outputs of which are combined in FIG. 8 as shown.

Figure 9:
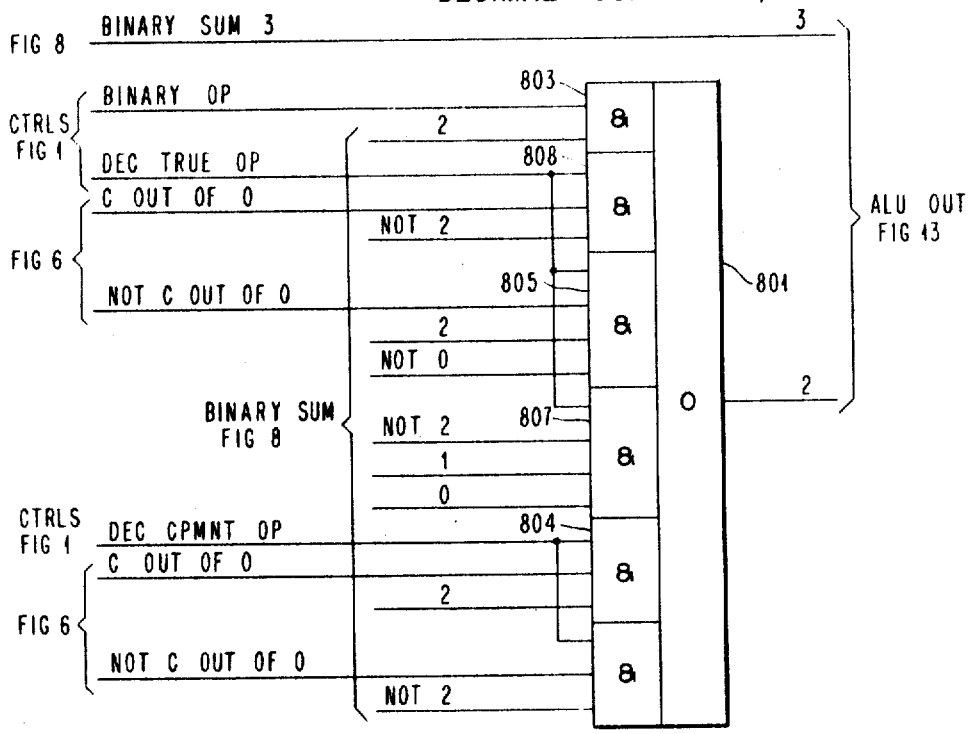
FIGS. 9 and 10 are schematic block diagrams of the decimal correction circuitry for the embodiment of FIG. 1.
Figure 10:
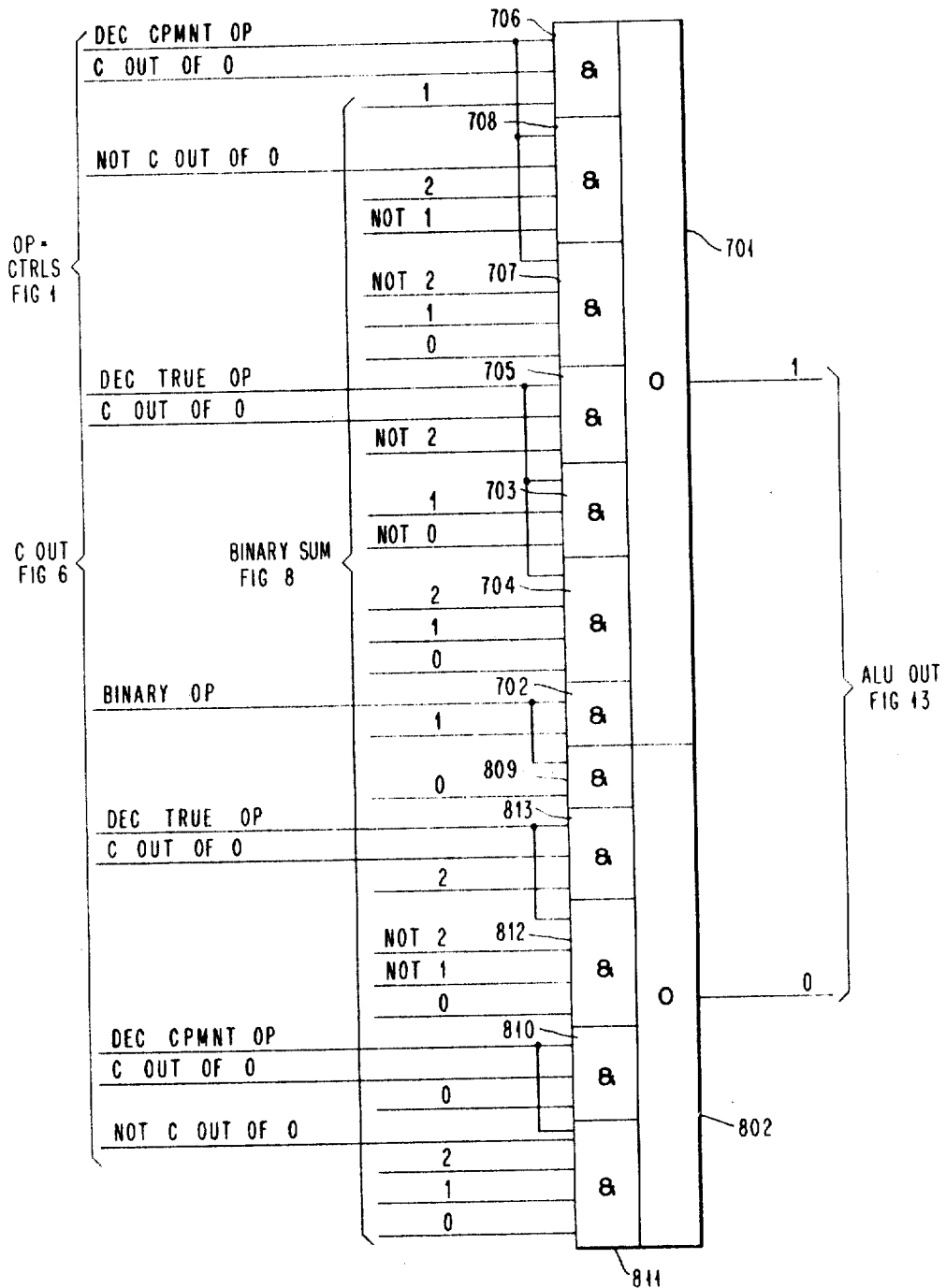

In the case of decimal addition, the sum out of the FINAL ADD stage might need correcting as is well known in the art. There are a variety of ways in which decimal correction can be performed, the way illustrated in FIGS. 9 and 10 herein being illustrative merely, no particular circuit design being required in the present invention; the circuits shown in FIG. 9 are, however, illustrative of relatively simple, high-speed arrangements suitable for use in an environment incorporating the present invention. In FIG. 9, a binary sum bit 3 (which is the lowest-ordered binary bit in the digit, and which equals decimal 1) is shown to be passed without change through the decimal correct circuit, without regard to whether decimal or binary addition is involved. This is due to the fact that it merely indicates the ODDness or EVENness of the digit, which characteristic is the same without regard to the binary or decimal nature of the operation. In binary operations, the circuits of FIG. 9 will pass the binary sum without change in response to a signal on the BINARY OP line being applied to an AND circuit 803 so as to permit a BINARY SUM 2 to generate an ALU OUT 2 signal in FIG. 9; similarly, the BINARY OP line in FIG. 10 permits an AND circuit 809 to pass BINARY SUM 0 through an OR circuit 802 without change so as to generate an ALU OUT 0 signal; and causes an AND circuit 702 to pass BINARY SUM 1 through an OR circuit 702 without change so as to generate an ALU OUT 1 signal. The decimal operations are far more complicated due to the nature of the logical technique involved (compared to arithmetic techniques which are conceptually simple but require far more hardware). For instance, if a decimal value of 14 were provided by the combination of bits at the output of the FINAL ADD stage, and a DECIMAL TRUE operation were involved, binary sums of 0, 1 and 2 (equalling decimal 8+4+2) would be applied to the inputs of the circuits of FIGS. 9 and 10. This would have to be converted to an ALU OUT having a decimal value of 4 (which is achieved merely by generating an ALU OUT 1 signal), together with a decimal carry, which is achieved (in FIG. 7, as described hereinbefore) by sensing the presence of bits 1 and 0 together in the AND circuit 513. In FIG. 10, an AND circuit 704 responds to a DECIMAL TRUE OP signal, to the lack of a hexadecimal carry out of the 0 bit, and to the presence of bits 0, 1 and 2 to recognize the decimal 14 and cause it to present an ALU OUT 1 bit, by passing a signal through the OR circuit 701. On the other hand, if a decimal 4 is achieved, then an AND circuit 703 responds to DECIMAL TRUE OP and to the presence of the BINARY SUM 1 bit (equalling decimal 4) with the absence of the BINARY SUM 0 bit (NOT 0, meaning no decimal 8 value). If a DECIMAL COMPLEMENT operation is involved, and either a 5 or a 4 is to be complemented, there will be a carry (requiring re-complementing) together with the presence of a binary sum bit 1 (which would equal 4 or 5 due to the fact that the BINARY SUM 3 determines ODDness or EVENness and it is passed without change). This will cause an AND circuit 706 to pass a signal through the OR circuit 701 and generate an ALU OUT 1 signal. Still another example is that if either a 2 or 3 (ODDness or EVENness being immaterial) is to be re-complemented, then there will be a BINARY SUM 2, a BINARY SUM NOT 1, and a carry present at the input of AND circuit 708 so as to cause the OR circuit 701 to generate an ALU OUT 1 signal.

The particular nature of a decimal correction circuit illustrated herein is not germane to the invention, the description given being for completeness of disclosure rather than to illustrate inventive concepts as such; therefore, unless a detailed explanation of an exemplary decimal correction circuit is useful, the following detailed explanation of the circuits of FIGS. 9 and 10 need not be studied.

A more detailed explanation may be understood with reference to the following truth table, wherein an X in a low-order position is utilized because a ZERO or ONE in the low order, or binary ONE bit position of the input is propagated directly without any conversion whatsoever, therefore the decimal correct circuitry of FIGS. 9 and 10 will decode a 6 in the same fashion as a 7, and a 2 in the same fashion as a 3, and so forth. (Note: BCD means binary coded decimal.)

| Decimal true | | | Decimal complement | | |
|---|---|---|---|---|---|
| Binary In | BCD Out | Dec. Value | Binary In | BCD Out | Dec. Value |
| 000X | 000X | 0, 1 | 011X | 000X | *0, 1 |
| 001X | 001X | 2, 3 | 100X | 001X | *2, 3 |
| 010X | 010X | 4, 5 | 101X | 010X | *4, 5 |
| 011X | 011X | 6, 7 | 110X | 011X | *6, 7 |
| 100X | 100X | 8, 9 | 111X | 100X | *8, 9 |
| 101X | C 000X | 10, 11 | C 000X | C 000X | 0, 1 |
| 110X | C 001X | 12, 13 | C 001X | C 001X | 2, 3 |
| 111X | C 010X | 14, 15 | C 010X | C 010X | 4, 5 |
| C 000X | C 011X | 16, 17 | C 011X | C 011X | 6, 7 |
| C 001X | C 100X | 18, 19 | C 100X | C 100X | 8, 9 |

*A borrow from the next higher-ordered byte is required.
C = Carry. X = 1 or 0, as the case may be, the output following the input in all cases.

To illustrate the operation of FIGS. 9 and 10 with respect to the truth table hereinbefore, considered the following examples:

```
1.  23        2.  17
   -17           -23
   ---           ---
    6            -6
```

Each of the digits in the example is represented in this apparatus by a four bit character, and subtraction is achieved by complement addition, so that the expression of the example rewritten in binary form would be as follows:

| 1. (23) | 0010 | 0011 | (17) | 0001 | 0111 |
|---|---|---|---|---|---|
| (Compl. 17) | +1110 | 1000 | (Compl. 23) | +1101 | 1100 |
| (Hot One) | + | 1 | (Hot One) | + | 1 |
| | C 0000 | 1100 | | | C 0100 |
| | | | (Carry) from 7-3 | 1 | |
| | | | | 1111 | C 0100 |
| BCD Output | C 0000 | 0110 | | −1001 | C 0100 |
| | | | Compl. | 1001 | 1011 |
| | | | (Hot One) | + | 1 |
| | | | | 0110 | 1100 |
| Final BCD Output | | | | *0000 | 0110 |

In order to achieve subtraction of one two-ordered value from another two-ordered value, two complete cycles are required, one for the units order, and one for the tens order. Considering Example 1 first, the logical connect circuits would add 3 (0011) to the complement of 7 (1000) together with a "hot one" or carry, supplied to the low-order position due to the fact that a complement add (subtraction) is being performed. For a complement add, LC signals of 1001 cause

NOT A∀B to be performed by the logic connect circuit. This would give a result of 1100 with no carry. This result therefore will cause a BINARY SUM 0, a BINARY SUM 1, but no BINARY SUM 2, and no BINARY SUM 3 to be applied to the decimal correct circuitry of FIGS. 9 and 10. Referring to the truth table, under DECIMAL COMPLEMENT, utilizing the top half of the tables (since no carry resulted), the value 1100 is found on the line 110$x$ which will cause a BCD output of 0110 (remembering that the lowest order, or BINARY SUM 3, output of the decimal correct circuit will either be a 1 or a 0 in dependence upon whether a ONE or a ZERO, respectively, was applied to the input of the decimal correct circuits). The manner in which this decoding takes place is as follows: the BINARY SUM 0 bit together with a lack of a BINARY SUM 2 bit, when in decimal complement form, will cause an AND circuit 707 (FIG. 10) to pass a signal through the OR circuit 701 to create an ALU OUT 1 output from FIG. 10. In FIG. 9, the DEC CPMNT OP signal, and NOT C OUT OF 0 (indicating no carry input) and BINARY SUM NOT 2 (indicating no binary 2 input), will cause the AND circuit 805 to pass a signal through the OR circuit 801 to generate an ALU OUT 2 output from FIG. 9. No ALU OUT 0 is generated (as none is needed in accordance with the truth table) since all the circuits which feed the OR circuit 802 are prevented (for one reason or another) from doing so with this combination of inputs. For instance, the AND circuits 812, 813 are operative only during decimal true operations, the AND circuit 809 is operative only during binary operations, the AND circuit 810 requires a carry input, and the AND circuit 811 requires a BINARY SUM 2 input. Thus, the logical connect and final add circuits have provided a sum in the correct binary form for the subtraction of a larger number from a smaller number by means of a complement addition, and the decimal correct circuitry of FIGS. 9 and 10 taking into account the presence or absence of the carry, corrects this to the proper BCD representation in ALU OUT signals.

On the next cycle (see Example 1, hereinbefore) 1 is subtracted from 2 by adding the 2 (0010) to the complement of 1 (1110) to derive an answer of 0000 with a carry (C). By referring to the truth table, it is seen that this should result in a BCD output of all ZEROs with a carry. In this case, the BCD carry output is indicative of the fact that a positive answer has resulted from the complement addition. A carry cannot mean a number greater than 10 since the subtraction of any number between 0 and 9 from another number between 0 and 9 can give answers only between 0 and 9 and between 0 and minus 9. Referring to FIGS. 9 and 10, the conversion of binary 0000 with a carry to BCD 0000 with a carry is accomplished because none of the AND circuits are capable of generating an output. Specifically, the only circuits which are activated with respect to OR circuit 701 during decimal complement operations are the AND circuits 706, 707 and 708. However, there must be a BINARY SUM 1 input for either AND circuits 706 or 707 to operate and there must be a BINARY SUM 2 input for AND 708 to operate. Similarly, the AND circuits 804, 805, 810 and 811 are operative during decimal complement operation, but AND circuit 804 requires a BINARY SUM 2 input, AND 805 requires no carry input, and the AND circuits 810 and 811 both require at least a BINARY SUM 0 input. Therefore, an all ZERO input with a carry results in an all ZERO output with a carry.

Considering now, Example 2, hereinbefore, where 23 is subtracted from 17, in the first cycle of operation, a 7 (0111) is added to the complement of 3 (1100), together with a low order carry-in, or "hot one," to derive a sum of 0100 with a carry. Referring to the truth table, an input of 0100 with a carry will result in an output of 0100 with a carry due to the fact that the only operative AND circuit in FIGS. 9 and 10 is the AND circuit 706 which responds to a BINARY SUM 1 and a carry, in a decimal complement operation, to cause the OR circuit 701 to generate an ALU OUTPUT 1 signal.

In the next cycle (see Example 2, hereinbefore), 2 is subtracted from 1 by adding 1 (0001) to the complement of 2 (1101) together with the carry-in (which resulted from adding 7 and complement 3 during the first cycle) so as to achieve a result of 1111 with no carry. By referring to the truth table, it can be seen that this amounts to a decimal value of 9 with a borrow, which results in a BCD output of 1001. This is achieved in FIGS. 9 and 10 by the AND circuit 811 which responds to the BINARY SUMS 0, 1, 2 and lack of a carry during decimal complement operations to cause an OR circuit 802 to generate an ALU OUT 0 signal. No ALU OUT 2 will be generated since AND 804 requires a carry, and the AND circuit 805 requires a lack of a BINARY SUM 2 input. In FIG. 10, no ALU OUT 1 is generated since AND circuit 707 requires the lack of a BINARY SUM 2 input, and AND circuit 708 requires the lack of a BINARY SUM 1 input, whereas AND circuit 706 requires a carry input. Thus, only the ALU OUT 0 is generated, and the BINARY SUM 3 bit (the lowest-ordered bit of the byte) is passed directly through the circuits without change as described hereinbefore.

Thus, the answer achieved in two cycles of addition is a tens order of 1001 and a units order of 0100. However, since a second cycle of addition comprises the last cycle in adding the two binary numbers (17 and minus 23) and since there was no carry as a result of this addition, which indicates that a borrow from a still higher-ordered digit is required, then this means the answer is negative, and a recomplementing must be achieved. In order to achieve this, third and fourth cycles are taken where the results previously achieved are passed through the complementing inputs to the arithmetic circuit (the logical connect circuit herein, with the LC controls set to 1010 so as to complement B, notwithstanding A) so as to recomplement the values. In the third cycle, the units order result (B digit) is passed throught the complement input to the logical connect circuit (the other input being all ZERO's), and the "hot one" is carried into the lowest-order bit position and supplied as usual, by inserting a carry in FIG. 7, in response to program control. Thus, the complement of 0100, which is 1011, has a ONE added to it so as to achieve a result of 1100 which is applied to the input of the decimal correct circuits. This result has no carry applied to it and therefore causes a decimal output of 0110 in accordance with the truth table, above. During the fourth cycle, since no carry resulted from the decimal correction of the third cycle result, no "hot one" is applied to the input of the adder, since a carry insert is provided by the program only for the lowest-ordered digit; the preliminary result of 1001 is recomplemented in the adder giving a final result of 0110 for the tens order. This result is applied to the decimal correct circuit, in accordance with the truth table, causes a BCD output of 0000, and the fact that this recomplementing has to take place (as indicated by the borrow* in the table) is taken as indicative of the fact that the total final answer is negative, thereby giving a total final answer of minus 000 0110, which equals minus decimal 6.

Other examples are more simple, wherein pure addition is involved. Of course, if a pure binary output of the decimal correct circuit is desired, then the AND circuits 702, 803, and 809 will create a binary output (ALU OUT) which is identical with the binary input (BINARY SUM) in all cases. In the case of decimal true operations, which are plain additions, the circuits of FIGS. 9 and 10 operate in accordance with the left-hand half of the truth table (set forth hereinbefore), in a manner which is identical to that described with respect to the decimal complement operations.

The changes in bit structure resulting from arithmetic operations in the adder make logical parity prediction a problem. Not only carries generated within the bytes being added, but carries from a previous addition may make radical changes in the number of bits in the sum.

Accordingly, carries must be considered in parity prediction. The speed requirements are such, however, that the parity prediction must be generated logically, in parallel and no less quickly than the sum. Also, the inputs to the parity predict should be generated by a circuit other than the one which generates the results per se, since an erroneous result will generate an equally erroneous (and therefore useless) parity. For these reasons, the parity predict mechanism may have its own logical connect and carry generation circuits, as described hereinbefore, which are duplicates of the logic and carry generation circuits for the adder proper. The duplication is necessary if circuit operation is to be checked since, if the parity section were to share the logical connect and carry generation circuitry of the logical section (adder), an error might provide its own compensation and pass unchallenged by parity checks. Parity predict also has its own carry latch which retains the carry and provides a REDUNDANT SAVED CARRY signal on the next cycle.

Parity prediction is accomplished by logical techniques from appropriate combinations of A and B inputs, logical connect outputs and redundant carry logic. In FIG. 12, a parity tree provides the actual new parity value to accompany the sum (or result) back to the B REG. It should be noted that the B register is used to store the new result, which comprises nine bits: a four bit result; the four unused C bits; and the NEW P (parity) bit; actual use of the new result depends on the remainder of the system (FIG. 1) and the particular operation involved.

In arithmetic operations only, the output parity equals the summation of the parity of one input byte, EXCLUSIVE ORed with the parity of the other input byte, EXCLUSIVE ORed with the parity of the carries which in fact occur in an arithmetic operation involving the two input bytes. In logical operations, another algorithm is used: the output of the redundant logical connect circuit (bottom of FIG. 2) is used to generate the parity of these outputs in a main EXCLUSIVE OR circuit. A separate logical connect circuit, other than the one used to generate the actual data answer, is required so as to have redundant circuits; in the event that one logical connect circuit has a failure, then the parity should not agree with the results. The parity carry circuits are redundant for the same reason that the logical connect is a redundant circuit. No outputs can be present from FIG. 5 during a logical operation because there is no carry left over from the last add (the machine having been reset), and there is no true add gate or complement add gate so that all outputs will be ZERO; therefore reflecting nothing in FIG. 12, even though there is a "flush" connection to FIG. 12 at all times: that is, even though there are no gates to select inputs to FIG. 12. Also, the parity of the input bits is in fact equal to the output of the logical connect circuit during arithmetic operations. This permits the logic bits, the carry factors (including decimal correct and the unusued four C bits) all to be flushed together in one big EXCLUSIVE OR tree, which is what FIG. 12 represents.

During addition, final parity can be affected by the true or complement nature of the byte processing operation. FIG. 12 responds to an INVRT P (invert parity) signal generated in FIG. 11, which introduces a conversion factor for either one of two special parity situations: decimal true 12 and decimal complement 10. The BCD 8, 4, $\bar{2}$ configuration equals decimal 12, and in a decimal true operation results in a decimal 2 and carry out and alters parity. The 8, $\bar{4}$, 2 situation (decimal 10 or 11) in decimal complement also alters parity.

Figure 11:
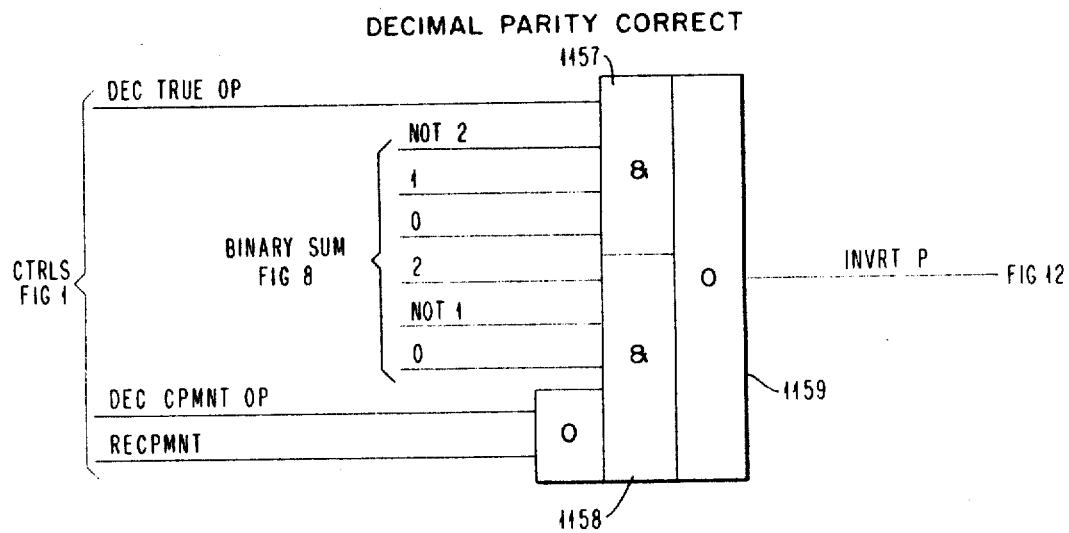
FIG. 11 is a schematic block diagram of decimal parity correction circuitry for the embodiment of FIG. 1.

In FIG. 11, an invert parity function is generated by an OR circuit 1159 in response to either of two AND circuits 1157, 1158 which respond to the decimal true 12 and decimal complement 10 situations respectively, that are described in the preceding paragraph. Thus, the parity of all the input bits, a saved carry, and the invert parity function are all taken into account in an EXCLUSIVE OR tree, as illustrated in FIG. 12, so as to generate a new parity bit which reflects the parity of the actual operations involved. This parity bit is applied through the straight-cross circuit without change, so as to be available in the parity-checked byte which is returned from the straight-cross circuit to the B register as a complete, parity-correct byte. It should be noticed that, in the event that two digits of a particular parity-checked byte of the B register are actually operated on (first the right digit and then the left digit, or vice versa), the parity bit will be changed twice in a given parity-checked byte, once in each of two successive iterations; furthermore, referring to Examples 1 and 2, hereinbefore, if recomplementing is involved, then the parity big might be changed two more times in any given byte: thus, a given parity bit might be altered as many as four times in a normal arithmetic operation, or two times in a logical operation.

As described hereinbefore, a four-bit arithmetic and logic unit is made available, in accordance with the present invention, to a data flow which includes more bits, and, in the given example, utilizes an 8-bit parity-checked byte. In order to proceed through a field (such as the entire setting of the B register) on a variable field length arithmetic or logic operation, it is necessary to take each of the digits of the B register, in turn and apply them to the arithmetic and logic circuits as described hereinbefore. In order to proceed, for instance, from right to left through successive digits of the B register, so as to perform arithmetic operations from low order to high order, it is necessary to read out the right-most byte of the B register and process the right digit therein as the B digit, and then restore the entire byte, with a corrected parity, to the B register, followed by selecting the right-most byte a second time, but taking the left digit therefrom as the B digit and performing an operation thereon and then restoring the entire byte with a new parity bit back to the low-order byte of the B register. This process would be repeated four times for a total of eight digits in a given operation that involved the entire B register. In order to take the right-hand digit first and then the left-hand digit of any selected byte, it is necessary to reverse the positions of these digits on some cycles, both as the digit is taken from the B register and applied to the ALU, and as the output of the ALU passes through the straight-cross circuit for return to the B register. The straight-cross circuit shown at the bottom of FIG. 1 is illustrative of a data flow control capable of performing this function, and is shown in detail on FIG. 13 herein. In FIG. 13, bits 0 through 3 of the C digit (the unused half of a byte in FIG. 1) and of the ALU OUT are applied to OR circuits which relate to bits 0 through 7 of an entire byte. If the result of the arithmetic and logic circuit is to be applied to the B register as the low-order (or right) digit of the byte, then a STRAIGHT signal would be supplied by the controls of FIG. 1 so as to enable an AND circuit 1310 to pass an ALU OUT bit through the OR circuit 1303 thus to comprise bit 7 of a parity-checked byte to be returned to the B register. On the other hand, if the output of the ALU is to be returned as the high-order (or left) digit of a byte in the B register, then a CROSS signal would be supplied by the controls of FIG. 1 so as to cause an AND circuit 1302 to pass bit 3 of the C (unused) digit through the OR circuit 1303 as bit 7 of the parity-checked byte to be returned to the B register. Similarly, all of the four bits of the ALU and of the C digit are applied to each of two AND circuits one of which will respond on STRAIGHT and the other on CROSS so that the ALU digit will be applied as bits 4 through 7 and the C digit is applied as bits 0 through 3 when the STRAIGHT signal is present, and the ALU digit will be applied as bits 0 through 3 with the C digit being applied as bits 4 through 7 in the presence of a CROSS signal. Other gating arrangements might be provided, the circuit of FIG. 13 being illustrative of a very simple manner in which data flow control in accordance with the present invention may be implemented.

The present invention is so arranged as to permit arithmetic and logical operations on a succession of digits, the digits comprising halves of parity-checked bytes, the digits being selected from the bytes so as to permit reaching either digit in a byte. Regardless of which digit is used, or how many times the digit may pass through the arithmetic and logic circuits, (such as for recomplementing) the parity of the entire byte is corrected on each operation of the arithmetic and logic circuit.

The unused digit of a parity-checked byte is utilized to predict the parity of the byte which is required to reflect the changes in the digit which is being used in the arithmetic and logic circuits, and otherwise is restored into the byte so as to send a complete byte back to the B register. STRAIGHT-CROSS circuits, (controlled data flow gates) are provided to permit selecting either digit of a byte both at the input and at the output of the ALU.

The arithmetic and logic section includes several features in accordance with the present invention. One of these is that the arithmetic and logic circuit does not contain a complete adder unit, but rather it utilizes the logic generating circuits to provide halfsums during arithmetic operations. All of the circuits are calculated to operate at high speeds, and carry propagate lookahead circuits are utilized so as to permit reaching a final sum, including the carry effects upon the sum, in a minimum of time. An optional feature is the usage of redundant logic circuits so as to permit checking of the operation of the arithmetic and logic circuits by means of the parity bit therein, the redundant logic circuits eliminating the possibility of errors hiding their own effect. Decimal correction is available for decimal arithmetic operations, the operations otherwise reflecting hexadecimal parity sums. In the event that logical operations are involved, the BINARY OP line is used, and the final add stage in FIG. 8 will pass any logic bits presented thereto since there will be no carries into any of these bits and the AND circuits which relate to a NOT carry into bit will pass any logic bit which appears; thus, these logic bits will appear in the binary sum. There are no carries during logical operations because there are no true add or complement add inputs to FIGS. 3, 4 and 5 during that time. It should be understood that variations in the carry circuits, the parity predict circuits, the decimal correct circuit, and the straight-cross circuit would have no effect on the principles of the present invention, and therefore the circuits shown herein are illustrative merely of an embodiment of the invention, and do not relate to inventive concepts within the individual circuits themselves.

While the invention has been particularly shown and described with reference to a preferred embodiment thereof, it will be understood by those skilled in the art that the foregoing and other changes and omissions in the form and detail thereof may be made therein without departing from the spirit and scope of the invention, which is to be limited only as set forth in the following claims.

What is claimed is:

1. For use within a data processing system capable of providing control and gating signals to control the movement of data manifestations and the operation of circuits related thereto, said system providing controlling signals and data signals to the various circuits, a digit processing unit, comprising:

a single logical connect circuit having multiple orders responsive to controlling signals to generate any selected one of sixteen possible logical combinations of two sets of input data;

carry generating means responsive to the output of said logical connect means, to the two sets of input data applied to said logical connect means, and to arithmetic control signals for generating signals indicative of carries from lower-ordered bit positions to higher-ordered bit positions, and carries out of the highest-ordered bit positions of said set of input data; said carry generating means providing no output signals during logical operations;

and a final adder stage responsive to said carry generating means and to said logical connect means for generating result signals which reflect the output of said logical connect means and the output of said carry generating means, said result signals comprising the outputs of said logical connect means unchanged in response to the absence of any carry outputs from said carry generating means, and comprising a final sum manifestation in response to the operation of said carry generating means.

2. The device described in claim 1 additionally comprising:

a decimal correct means responsive to manifestations from said carry means and from said final adder stage under control of signals indicative of decimal arithmetic operations to generate binary coded decimal output signals which reflect the arithmetic result value represented in binary fashion by the output of said final adder stage and the manifestations of said carry generating means, said decimal correct means responsive under control of signals indicative of binary arithmetic operations to pass the output of said final adder stage unchanged.

3. The device described in claim 1 additionally comprising:

a second single multi-ordered logical connect circuit responsive to controlling signals to generate any selected one of sixteen possible logical combinations of said two sets of input data;

a second carry generating means responsive to the output of said second logical connect means, to the two sets of input data applied to both of said logical connect means, and to arithmetic control signals for generating signals manifesting carries from lower-ordered bit positions to higher-ordered bit positions, and carries out of the highest-ordered bit positions;

a source of data manifesting bits;

and parity generating means responsive to said source of data manifesting bits, said second logical connect means and said second carry generating means to generate a parity bit for a total parity-check group of data manifestations including manifestations of said source of data manifesting bits and of said final adder stage.

4. For use within a data processing system capable of providing control and gating signals to control the movement of data manifestations and the operation of circuits related thereto, said system providing controlling signals and data signals to the various circuits, said data processing system performing arithmetic and logical operations on units of data comprising N manifestation bits in each unit, a device for correcting the parity of groups of data bits related to a single parity bit which groups comprise more than N data bits, comprising:

an arithmetic and logic unit for performing arithmetic and logic functions on two units of input data, said units coming from different parity groups;

data flow means responsive to the output of said arithmetic and logic unit, said data flow means having a capacity in excess of N data bits and including a further position responsive to a parity bit;

a source of other data bits for said data flow means, said data flow means being responsive to said source;

and parity generation means responsive to said arithmetic and logic unit and to said source of other data bits to generate a parity manifestation reflecting the parity count of the total data input to said data flow means, including the output of said arithmetic and logic unit and the bits from said source of other data bits.

5. The device described in claim 4 additionally comprising:

straight-cross means responsive to controlling signals, to the output of said arithmetic and logic means, and to said additional source of input data to provide a combined group of data bits, the output of said arithmetic and logic means providing the low-order portion of said combined group of data bits and the bits of said independent source comprising the high-order portion of said combined group of data bits, or vice versa, alternatively, in dependence upon the controlling signals applied thereto.

References Cited
UNITED STATES PATENTS

| | | | |
|---|---|---|---|
| 3,083,910 | 4/1963 | Berkin | 235—153 |
| 3,196,260 | 7/1965 | Pugmire | 235—153 X |

MALCOLM A. MORRISON, Primary Examiner

CHARLES E. ATKINSON, Assistant Examiner

U.S. Cl. X.R.

235—175; 340—172.5